(12) United States Patent
Sherbeck et al.

(10) Patent No.: US 10,144,592 B2
(45) Date of Patent: Dec. 4, 2018

(54) FLOATING TRAVERSE SYSTEM

(71) Applicant: FORUM US, INC., Houston, TX (US)

(72) Inventors: Timothy Sherbeck, Katy, TX (US);
Gerardo Guerra, Houston, TX (US);
Joshua Brandon Meuth, Giddings, TX (US)

(73) Assignee: FORUM US, INC., Houston, TX (US)

(*) Notice: Subject to any disclaimer, the term of this patent is extended or adjusted under 35 U.S.C. 154(b) by 258 days.

(21) Appl. No.: 15/154,924

(22) Filed: May 13, 2016

(65) Prior Publication Data
US 2017/0327321 A1    Nov. 16, 2017

(51) Int. Cl.
*B65G 35/00* (2006.01)
*E21B 19/14* (2006.01)
*E21B 19/15* (2006.01)

(52) U.S. Cl.
CPC .............. *B65G 35/00* (2013.01); *E21B 19/14* (2013.01); *E21B 19/155* (2013.01)

(58) Field of Classification Search
CPC .. B65G 35/00; B61B 3/00; B61B 3/02; B61B 12/00; B61B 12/007; B61B 12/12; B61B 12/122; B61B 12/125; E01B 25/00; E01B 25/08
See application file for complete search history.

(56) References Cited

U.S. PATENT DOCUMENTS

| | | | |
|---|---|---|---|
| 3,464,095 A | 9/1969 | Chambers | |
| 4,215,848 A * | 8/1980 | van de Werken | B66F 1/025 254/107 |
| 4,333,634 A | 6/1982 | Malzacher | |
| 4,348,007 A | 9/1982 | Malzacher | |
| 4,572,481 A | 2/1986 | Chambers | |
| 7,574,962 B2 * | 8/2009 | Kling | B61B 3/00 104/89 |
| 9,316,262 B2 | 4/2016 | Muller et al. | |
| 9,765,831 B2 | 9/2017 | Krbelaez et al. | |
| 2009/0274545 A1 | 11/2009 | Liess et al. | |
| 2012/0130537 A1 | 5/2012 | Gerber | |

FOREIGN PATENT DOCUMENTS

| | | |
|---|---|---|
| DE | 4237730 A1 | 5/1994 |
| GB | 1558987 A | 1/1980 |
| WO | 2009117813 A1 | 10/2009 |
| WO | 2011/011887 A1 | 2/2011 |

OTHER PUBLICATIONS

International Search Report and Written Opinion for Application No. PCT/US2017/027212 dated Jul. 12, 2017.
International Search Report and Written Opinion for Application No. PCT/US2016/019131 dated May 6, 2016.

* cited by examiner

*Primary Examiner* — Robert J McCarry, Jr.
(74) *Attorney, Agent, or Firm* — Patterson & Sheridan, L.L.P.

(57) ABSTRACT

A traverse actuating and gripping system configured to move a catwalk relative to a support structure. The system includes a body, an upper gripping pad coupled to the body and configured to contact a side of a support member of the support structure, a lower gripping pad coupled to the body and configured to contact an opposing side of the support member, and an actuator coupled to at least one of the gripping pads and configured to move the gripping pads between a gripping position that grips the support member and an open position that spaces one of the gripping pads away from the support member.

19 Claims, 15 Drawing Sheets

US 10,144,592 B2

FLOATING TRAVERSE SYSTEM

BACKGROUND

Field

Embodiments disclosed herein relate to a system and method for moving heavy objects relative to a drill floor. Specifically, embodiments disclosed herein relate to a gripping device of a traverse system that may be used to move and secure a catwalk on a drill rig, such as catwalks used for conveying tubulars between a drill floor and a lower section of the drilling rig or drill site.

Description of the Related Art

In a drilling operation or rig work-over operation, whether on a water-based (offshore) or a land-based drilling rig, tubulars, such as drill pipe, risers, casing or other tubulars, are often stored at, or supplied from, a level that is below the drill floor. In some offshore drilling operations, the tubulars are stored on a pipe deck that is located adjacent to, but below the drill floor. The tubulars are transported to the drill floor from the pipe deck and then may be transported back to the pipe deck from the drill floor. The tubulars may be transferred using a "catwalk" to move the tubulars between the pipe deck and the drill floor.

In certain offshore rigs, the drill floor may be moved relative to the rig to drill multiple wells. Thus, the catwalk may be required to be moved to get the tubulars closer to the well location, and/or to have access to the drill floor, such as the "V door" of the drill floor. The catwalk may be supported on a series of spaced-apart beams forming an effective table that supports the catwalk frame. A longitudinal length of the beams (may be about 30 feet in length) is typically positioned transverse to a longitudinal length of the catwalk such that the catwalk frame can be pushed or pulled laterally across the longitudinal length of the beams relative to the drill floor or the position of the well. Typically, the catwalk frame is moved by winches or hydraulic rams that push or pull the catwalk frame along the longitudinal length of the beams. When the catwalk frame is not moving, the frame is fastened to the beams using pins.

In order to provide a stable support surface and promote smooth movement of the catwalk frame across the beams, the top surface (flange) of the beams must be substantially coplanar and/or level. However, due to manufacturing irregularities of the beams and/or irregularities in the surface on top of which the beams are installed, the beams may not be satisfactorily coplanar and/or level. Thus, a leveling process, such as a milling process, must be performed to level the beams. Due to the size and the number of beams, a milling machine may be necessary, and the milling process must be performed on the rig, which requires the milling machine to be transported to the rig. Any one of or a combination of the machine, the transport and the milling operation is very expensive.

There is a need for new and/or improved methods and apparatus for moving a catwalk on beams.

SUMMARY

In one embodiment, a traverse actuating and gripping system configured to move or secure a catwalk relative to a support structure containing at least one support member is provided. The system includes a body, an upper gripping pad coupled to the body and configured to contact a side of a support member of the support structure and a lower gripping pad coupled to the body and configured to contact an opposing side of the support member, and an actuator coupled to at least one of the gripping pads and configured to move the gripping pads between a gripping position that grips the support member and an open position that spaces one of the gripping pads away from the support member.

In another embodiment, a catwalk system for transferring tubulars is provided. The system includes a frame for supporting a catwalk, a support structure that supports the frame of the catwalk, and a traverse actuating and gripping device for at least one of moving the frame, securing the frame, or combinations thereof, relative to a support member of the support structure, the traverse actuating and gripping device comprising a body, an upper gripping pad coupled to the body and configured to contact a side of the support member and a lower gripping pad coupled to the body and configured to contact an opposing side of the support member, and an actuator coupled to at least one of the gripping pads and configured to move the gripping pads between a gripping position that grips the support member and an open position that spaces one of the gripping pads away from the support member.

In another embodiment, a method for moving a frame relative to a drill floor is provided. The method includes providing a frame, providing a support structure that supports the frame, wherein the support structure has at least one support member, and moving the frame along a length of the support structure by intermittently gripping the at least one support member with a gripping device.

BRIEF DESCRIPTION OF THE DRAWINGS

The appended drawings illustrate only typical embodiments and are therefore not to be considered limiting of the scope of the disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
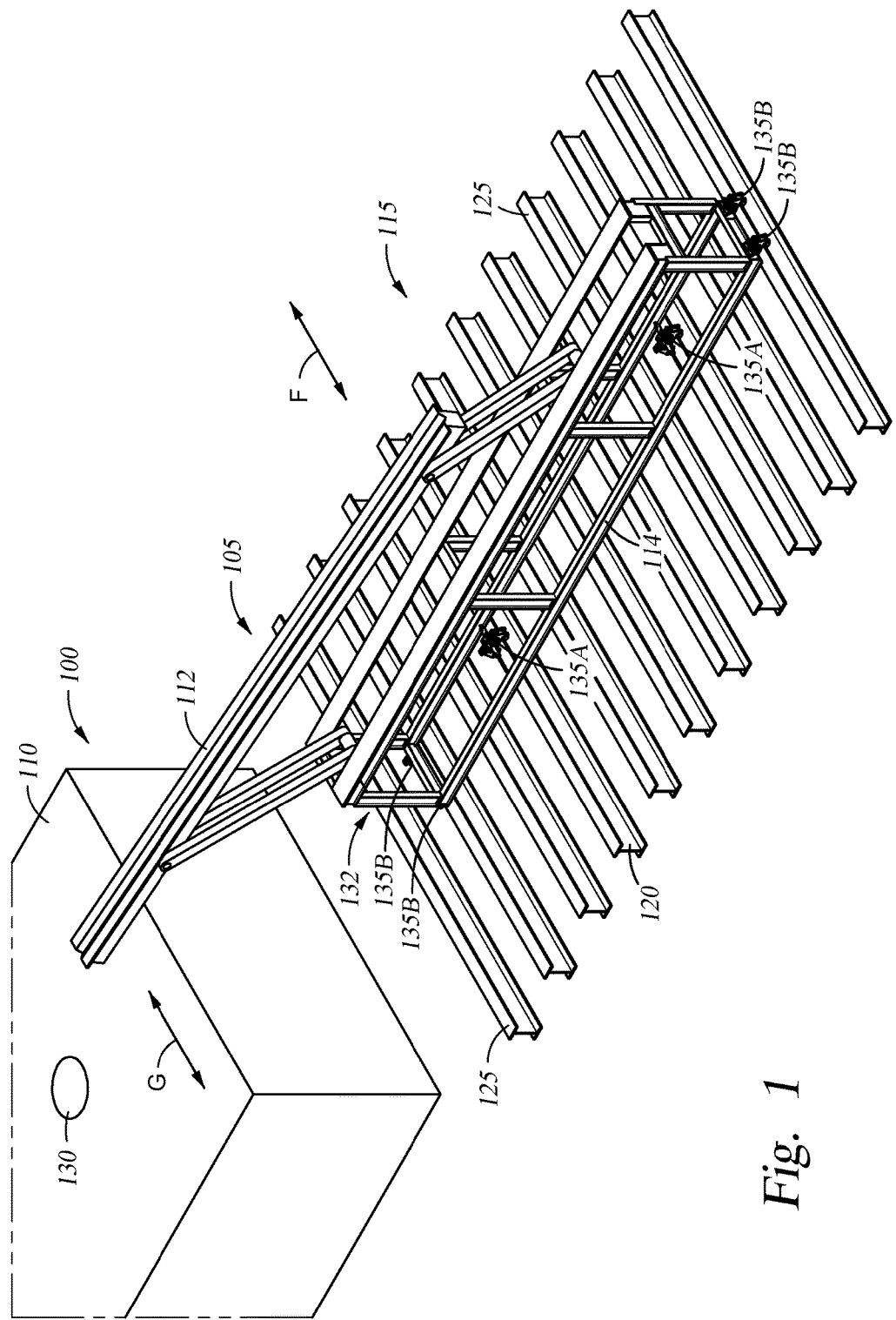
FIG. 1 is a perspective view of a portion of a drilling rig and a catwalk with a traverse system according to one embodiment.

FIG. 1 illustrates a perspective view of a portion of a drilling rig 100. The drilling rig 100 may be an offshore drilling rig or a land-based drilling rig. A catwalk 105 is positioned adjacent to and below an upper level of a drill floor 110. The catwalk 105 is utilized to transport tubulars (not shown), such as drill pipe, risers, casing or other tubulars, from a lower level, such as a pipe storage location adjacent to the catwalk 105 to or from the drill floor 110. The catwalk 105 includes a V-shaped trough 112 which supports the tubulars during transfer to the upper level of the drill floor 110. While not shown, a skate or other conveyance device may move along the length of the trough 112 to push or pull the tubular during transfer.

The catwalk 105 is shown supported on a frame 114 that is supported on a support structure or table 115, which comprises a plurality of spaced-apart beams 120. The beams 120 may be "I" beams, "W" beams or "T" beams and each beam 120 may include a longitudinal length from about 20 feet to about 40 feet. Each of the beams 120 include a flange 125 or other support member which at least partially contacts the frame 114 of the catwalk 105. Due to manufacturing irregularities of the beams 120 and/or irregularities in the surface on top of which the beams 120 are installed, the beams 120 may not be level. The longitudinal length of the beams 120 may be positioned transverse to a longitudinal length of the frame 114 such that a travel path for the catwalk 105 is provided in the direction of the arrows "F". The movement of the catwalk 105 may be necessary or desired if the location of a well, denoted by a rotary table 130, is moved. For example, the drill floor 110 may be moved laterally in the direction of the arrows "G" to drill multiple wells. The movement of the drill floor 110 also moves tubular handling equipment located on the drill floor 110 and/or access points for the catwalk 105. Thus, the catwalk 105 may need to be moved to have access to the drill floor 110 and/or be closer to the rotary table 130.

To move and/or secure the catwalk 105 to the table 115, the frame 114 is coupled to the table 115 by a traverse system 132. The traverse system 132 may include a plurality of brake devices 135A, 135B attached to the frame 114. The brake devices 135A are actuatable to secure the frame 114 to one or more of the beams 120 as well as move the frame 114 relative to the beams 120. The brake devices 135B may be actuatable to grip the flanges 125 of the beams 120 to secure the frame 114 to the table 115, and release the flanges 125 of the beams 120 to allow movement of the frame 114, or allow movement of the brake devices 135A, relative to the table 115. The brake devices 135A and 135B are operable on the table 115 without the need for milling or performance of other leveling processes on the beams 120. While two brake devices 135A and four brake devices 135B are shown in FIG. 1, more brake devices 135A may be used, and more or less brake devices 135B may be used depending on the size of the frame 114.

Figure 2:
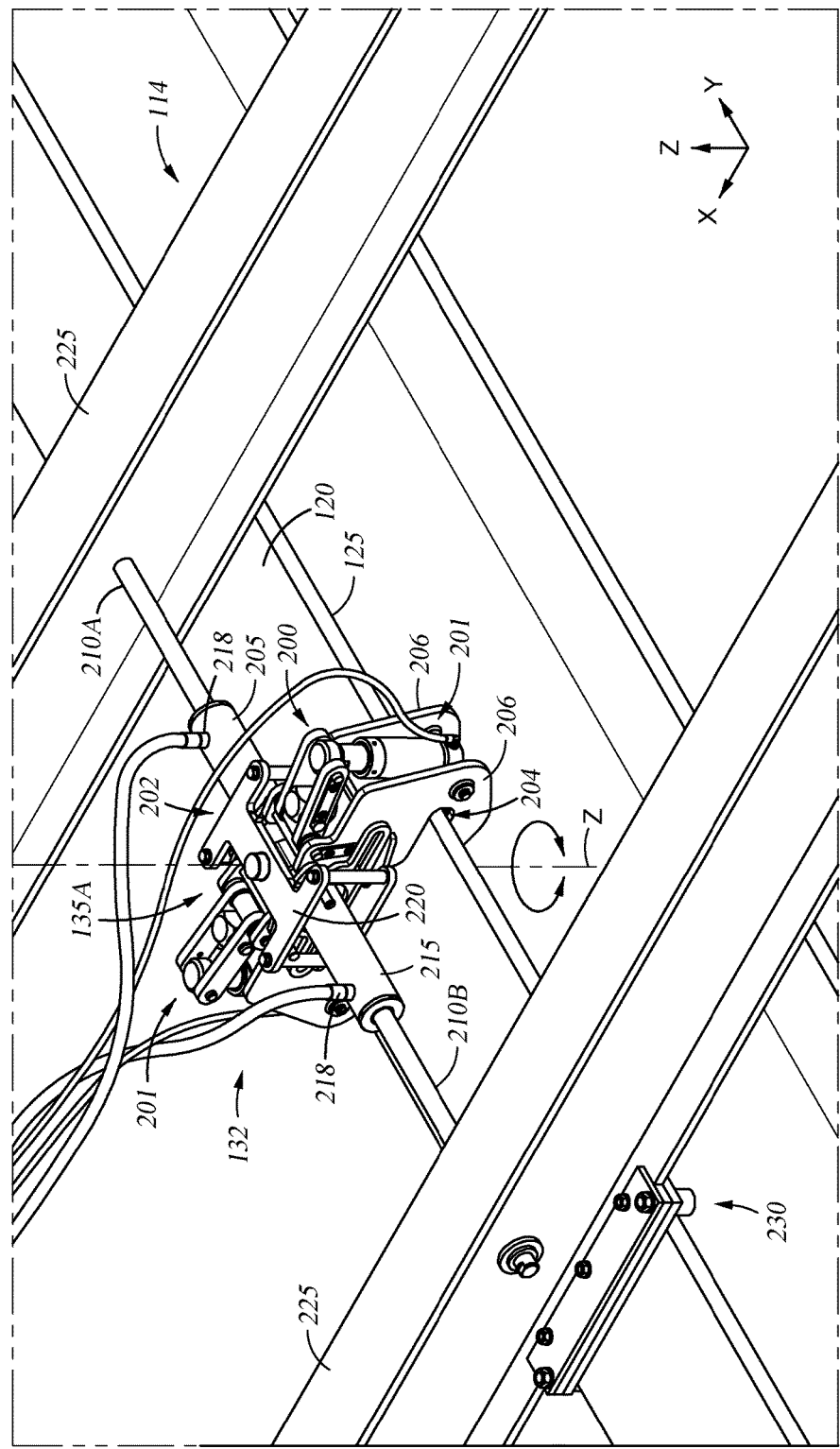
FIG. 2 is an isometric view of one embodiment of a traverse system.

FIG. 2 is an isometric view of one embodiment of the brake device 135A. The brake device 135A includes a brake body 200 having one or more brake actuators 201 within a slot 204 formed in a housing 206 that selectively grips the flange 125 of a beam 120. The brake body 200 also includes a movement device 202 that is coupled to the frame 114 of the catwalk 105. The brake body 200 may selectively grip the flange 125 in one mode of operation and release the flange 125 in another mode of operation. The brake device 135A may also use the movement device 202 to move the frame 114 relative to the beam 120 in one mode of operation, or move the brake body 200 relative to the frame 114 and/or the beam 120 in another mode of operation.

The movement device 202 may be a hydraulic cylinder 205 having a first rod 210A and a second rod 210B extending from a cylinder body 215. The cylinder body 215 also includes ports 218 for coupling to a source of hydraulic fluid. The cylinder body 215 may be coupled to the brake body 200 by a trunnion structure 220. The trunnion structure 220 may allow at least partial rotational and/or longitudinal movement of the movement device 202 about an axis Z (while fixing the movement device 202 in the X or Y directions). A distal end of the first rod 210A and the second rod 210B are coupled to opposing support members 225 of the frame 114, as shown. Guide rollers 230 may also be coupled to opposing support members 225 of the frame 114 to help guide the frame 114 along the flange 125.

Figure 3A:
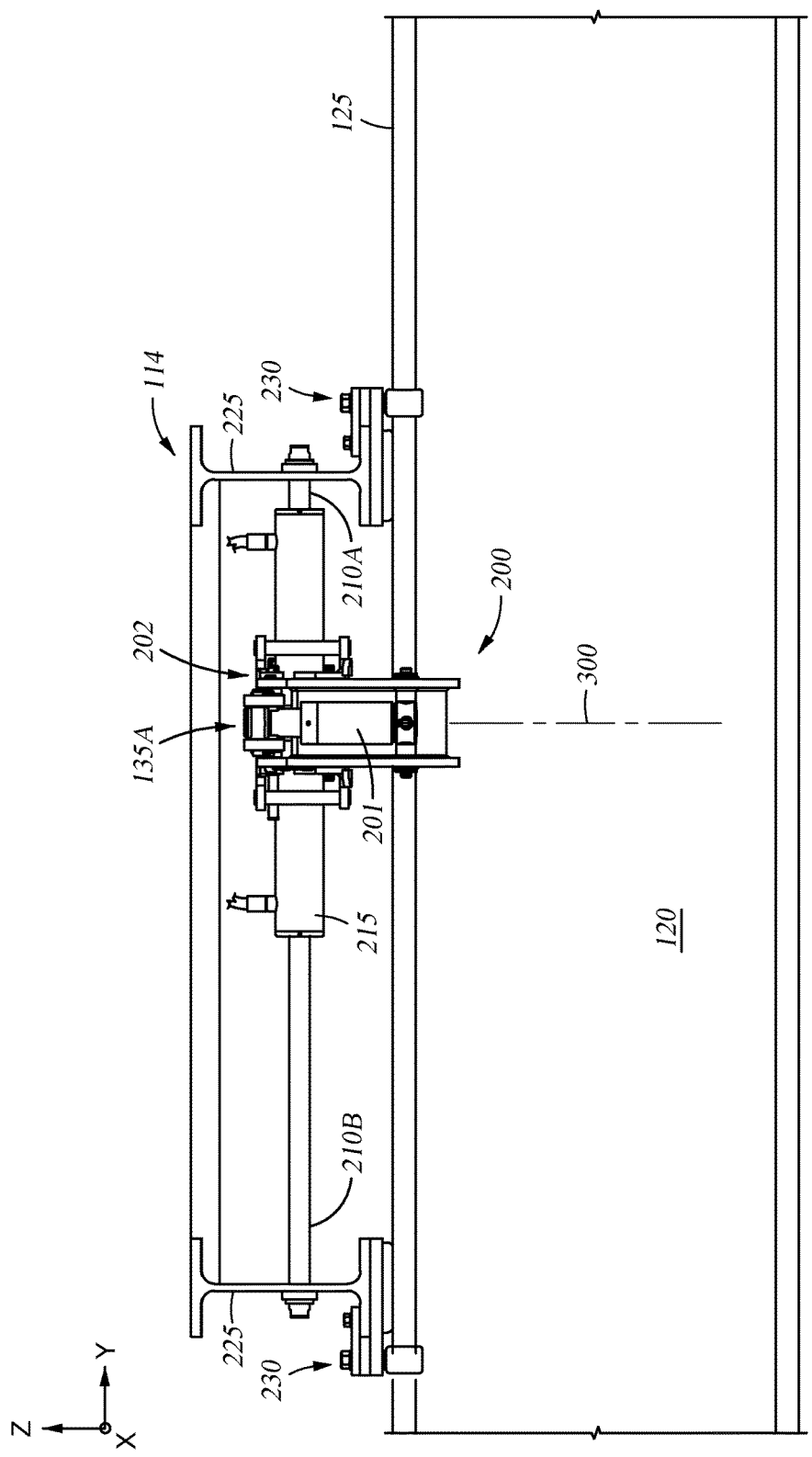
FIGS. 3A-3C are schematic side views illustrating operation of the traverse system.
Figure 3B:
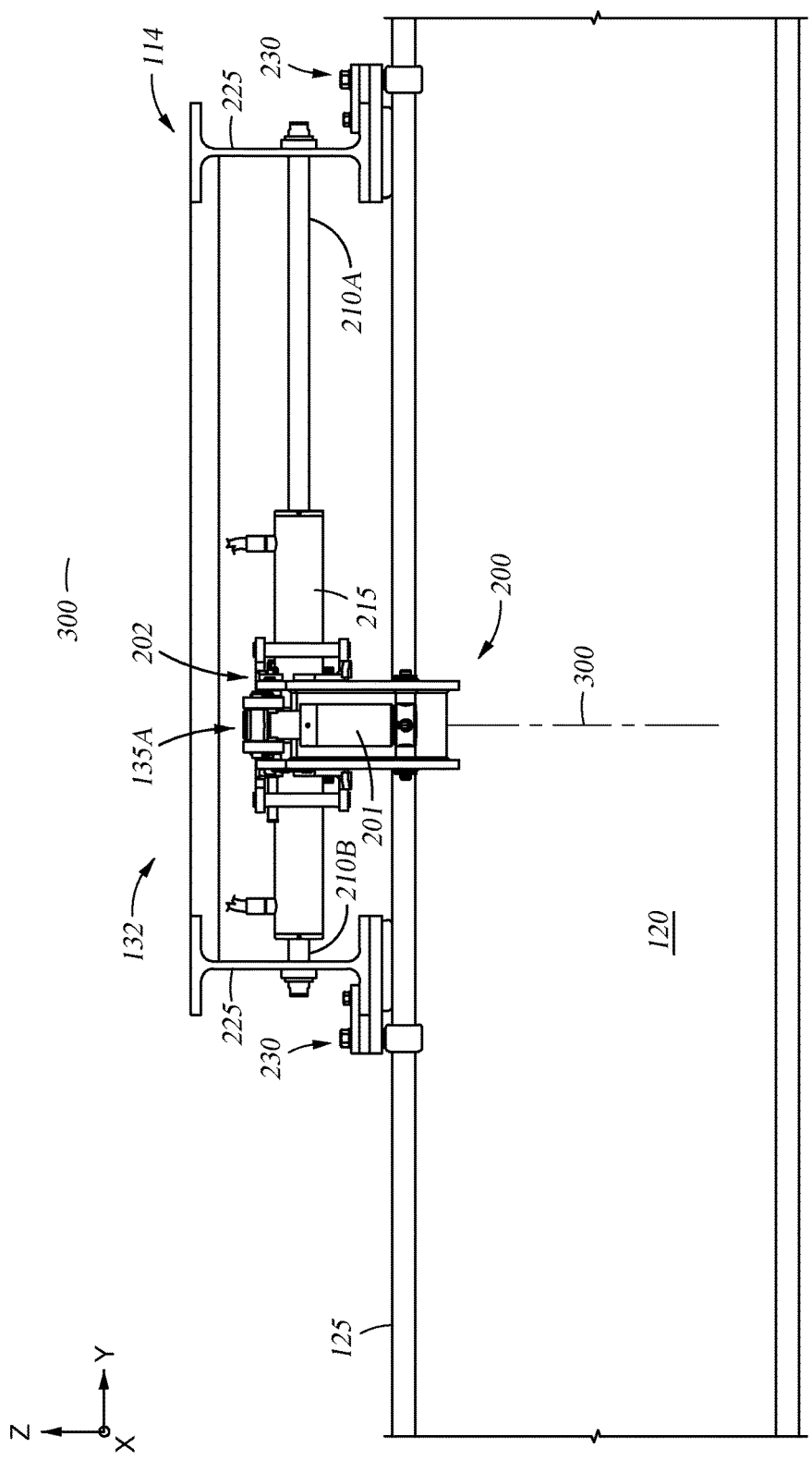
Figure 3C:
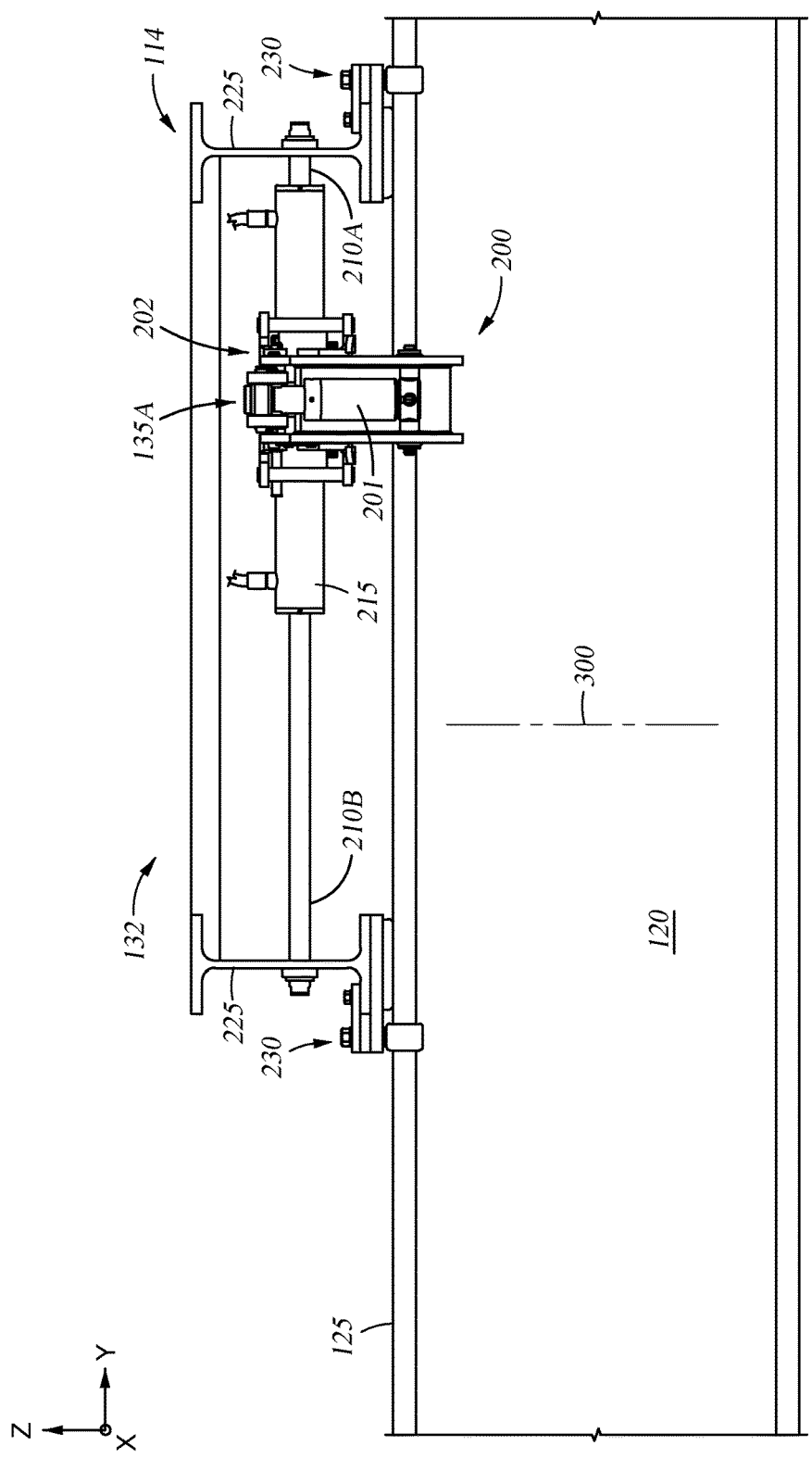

FIGS. 3A-3C are schematic side views illustrating an operation of the traverse system 132. FIG. 3A shows the brake device 135A at a first position relative to the frame 114. In this first position, the brake actuator 201 may be set to grip the flange 125 of the beam 120 in order to secure the frame 114 to the beam 120. The first position may also be utilized to move the frame to a second position as shown in FIG. 3B. Two or more brake devices 135A may be used to move the frame 114 as shown in FIG. 1. The brake device 135A can be moved to a third position relative to the frame 114 as shown in FIG. 3C.

As shown from FIG. 3A, in a movement operation for moving the frame 114, the brake actuator 201 may be set to grip the flange 125 of the beam 120 while the first rod 210A is caused to extend away from the cylinder body 215 (and/or the second rod 210B may be caused to retract toward the cylinder body 215). The brake devices 135B (shown in FIG. 1) are set to float during this movement operation. The extension of the first rod 210A causes displacement of the frame 114 in the Y direction to a second position as shown in FIG. 3B. A reference line 300 is included in the Figures to aid in showing relative movement. In the second position, the brake actuator 201 may be set to grip the flange 125 of the beam 120 in order to secure the frame 114 to the beam 120. If more displacement is needed, the brake actuator 201 may be set to release the flange 125, and the second rod 210B may be caused to extend away from the cylinder body 215 (and/or the first rod 210A may be caused to retract toward the cylinder body 215), which causes the brake body 200 to move in the Y direction to a third position as shown in FIG. 3C. During movement of the brake body 200, the brake devices 135B (shown in FIG. 1) may be set to grip the frame 114 to allow lateral relative movement of the brake body 200 by one or both of gravity and braking provided by the brake devices 135B. In this third position, the brake actuator 201 may be set to grip the flange 125 of the beam 120 in order to secure the frame 114 to the beam 120. If more displacement of the frame 114 is needed from this third position shown in FIG. 3C, the brake actuator 201 may be set to grip the flange 125 of the beam 120 while the first rod 210A is caused to extend away from the cylinder body 215 (and/or the second rod 210B may be caused to retract toward the cylinder body 215) as shown from FIG. 3A to FIG. 3B. The movement of the brake body 200 and/or the frame 114 may be repeated as shown in FIGS. 3A-3C until the desired displacement of the frame 114 is achieved, limited only by the length of the beams 120.

Figure 4:
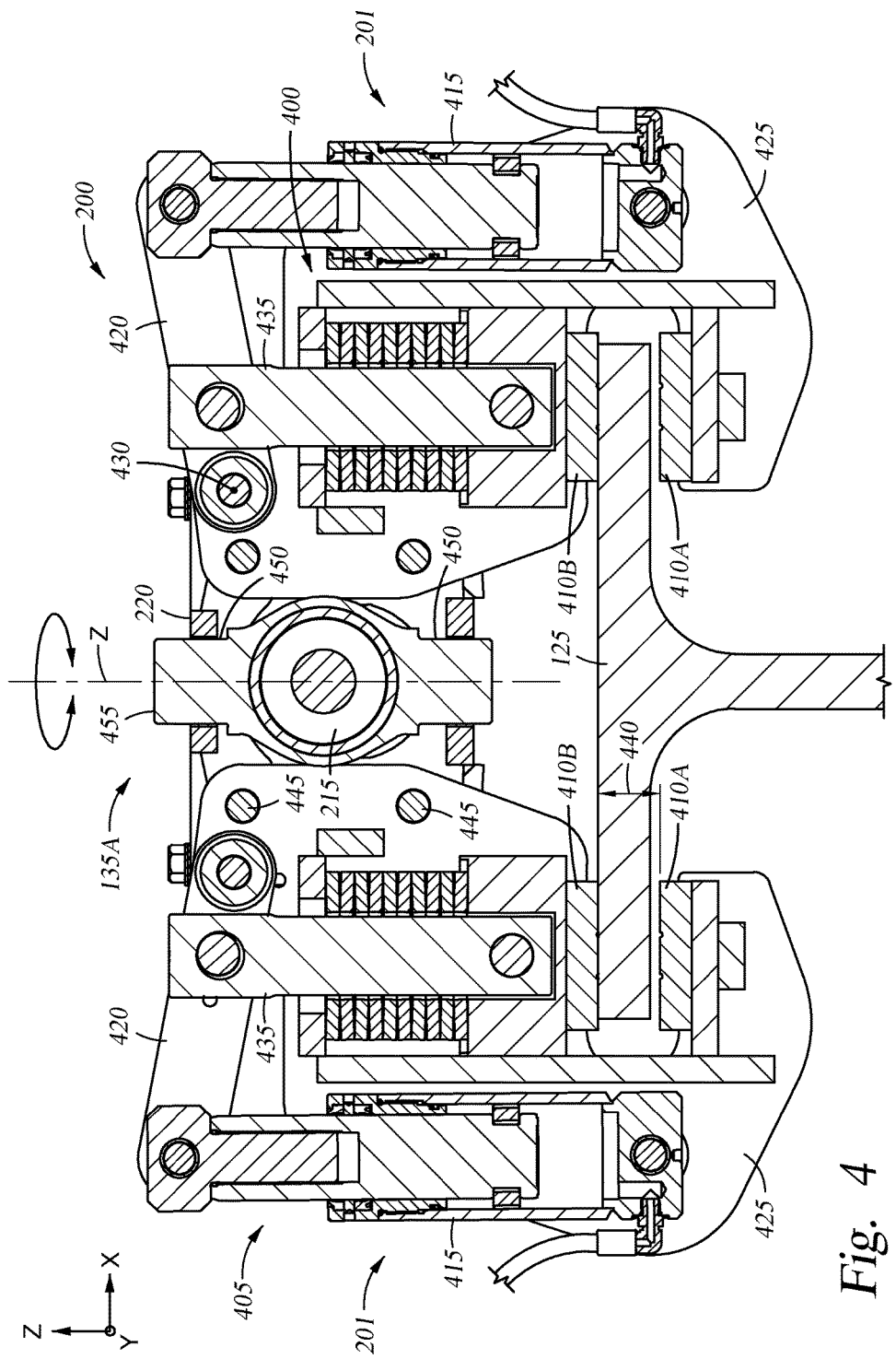
FIGS. 4 and 5 are side cross-sectional views of one embodiment of a brake device of the traverse system.
Figure 5:
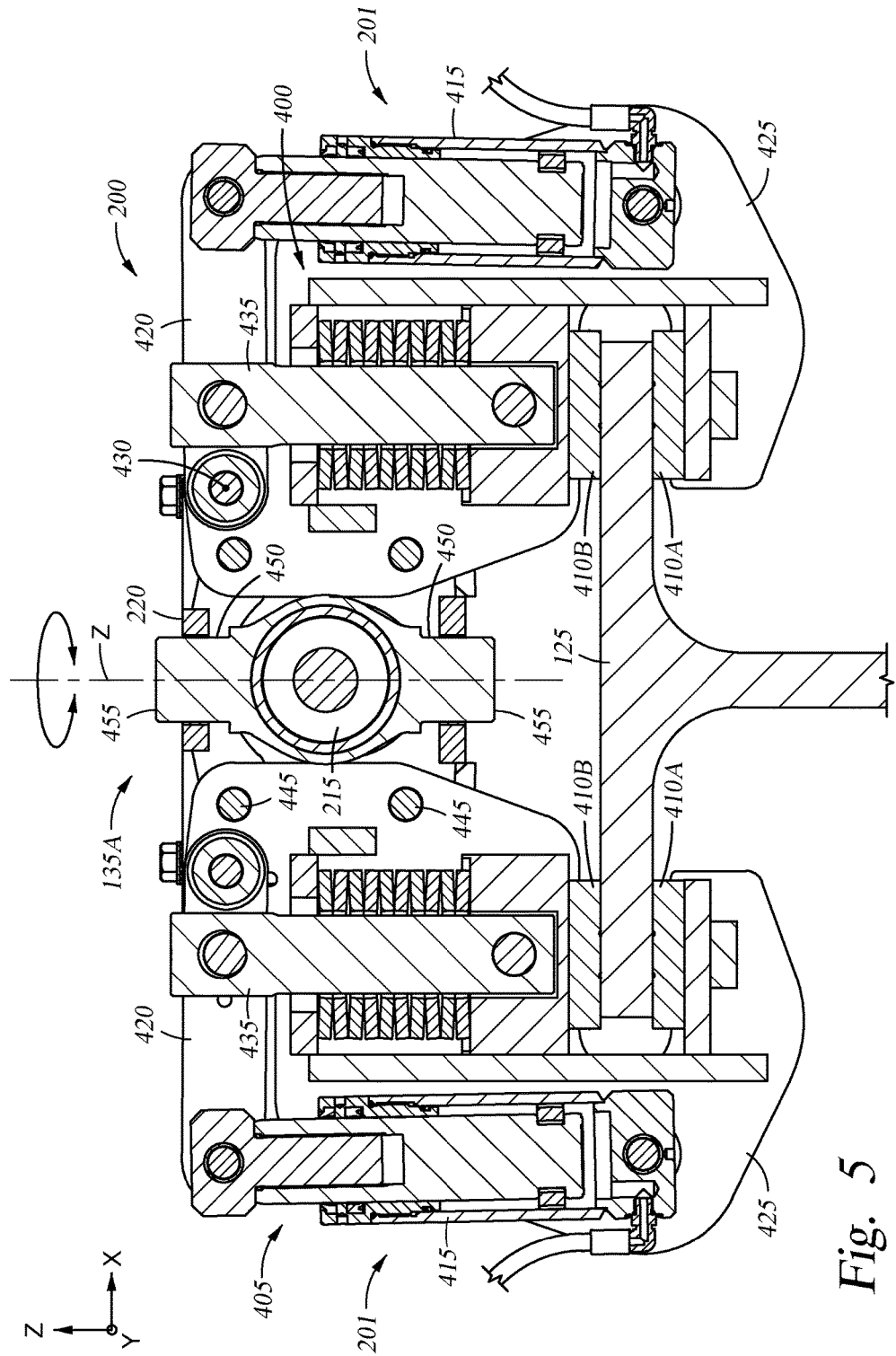

FIGS. 4 and 5 are side cross-sectional views of one embodiment of a brake body 200 of the brake device 135A. FIG. 4 shows the brake body 200 in a released (i.e., floating) position and FIG. 5 shows the brake body 200 in a fixed (i.e., braking position). Each of the brake actuators 201 may include a spring mechanism 400 and a hydraulic actuation system 405. Both of the spring mechanism 400 and the hydraulic actuation system 405 control gripping of brake pads 410A and 410B. The spring mechanism 400 is constantly under compression regardless of the position of the brake pads 410A and 410B. The spring mechanism 400 may be a plurality of Belleville washers, or other type of compression washer or spring. Thus, if no pressure is provided to the hydraulic actuation system 405, the spring mechanism 400 causes the brake pads 410A, 410B to clamp, which provides braking of the brake body 200. The brake pad 410A may be made of a metallic material, such as steel, and the brake pad 410B may be made of a polymer material or a composite material, although other materials may be used.

The hydraulic actuation system 405 includes a hydraulic cylinder 415 coupled to a linkage arm 420 and a brake body plate 425. The linkage arm 420 pivots about pivot point 430 and is coupled to a linkage arm 435, which is coupled to the brake pad 410B. Pressurizing the hydraulic cylinder 415 extends a rod to move the linkage arm 435 (via linkage arm 420), which causes the brake pad 410B to lift slightly in the Z direction away from the brake pad 410A. The movement of the linkage arm 435 also causes compression of the spring mechanism 400, which causes the brake pads 410A and 410B to move away from each other unclamping from the flange 125. Due to the weight of the frame 114 (and the catwalk 105 coupled thereto), the brake pad 410B remains in constant contact with an upper surface of the flange 125, but slight relative movement between the brake pads 410A and 410B causes the brake pad 410A to move away from a lower surface of the flange 125.

In the unclamped position, the spacing between the lower surface of the flange 125 and a gripping surface of the brake pad 410A may be greater than about 0 millimeters (mm) to about 2 mm. In one embodiment, in the unclamped position, a spacing 440 between gripping surfaces of the brake pads 410A and 410B is about 36 mm to about 38 mm, which is within the mill tolerances of the flange 125 (i.e., the mill tolerance of the thickness of the flange, the mill tolerance for squareness of the flange) as prescribed by the American Society for Testing and Materials (ASTM). However, in other embodiments, the spacing 440 may be set to accommodate for whatever tolerance is needed to allow movement of the brake pads 410A and 4106 along the longitudinal length of the beams 120.

When the hydraulic cylinder 415 is depressurized, the spring mechanism 400 decompresses slightly and the brake pads 410A and 410B grip the flange 125 as shown in FIG. 5. The constant compression provided by the spring mechanism 400 provides positive braking and hydraulic pressure releases the brake pads 410A and 410B, as opposed to providing braking. This provides a safety measure by preventing movement of the frame 114 and the catwalk 105 coupled thereto. The hydraulic cylinder 415 incorporates a threaded mount which can be threaded out by turning the rod to release the brake during maintenance in order to replace brake pads or remove the catwalk in the event of no hydraulic power.

The trunnion structure 220 is mounted to the brake body 200 by pins 445. The trunnion structure 220 may be mounted to the brake body 200 such that the brake body 200 floats in the Z axis as the brake body 200 moves along the Y direction. Spaces 450 are provided to provide slight movement of the brake body 200 due to variations in the flange 125 (in the Y direction). For example, the spaces 450 may provide movement of the brake body 200 of about +/−10 mm in the Z direction.

Extensions 455 of the hydraulic cylinder 205 may be pivotable relative to the Z axis. This allows the cylinder body 215 and/or the brake body 200 to pivot slightly during movement of the frame 114 or the brake device 135A. The pivoting may also allow movement of the frame 114 across the beams 120 at a non-normal angle.

Figure 6:
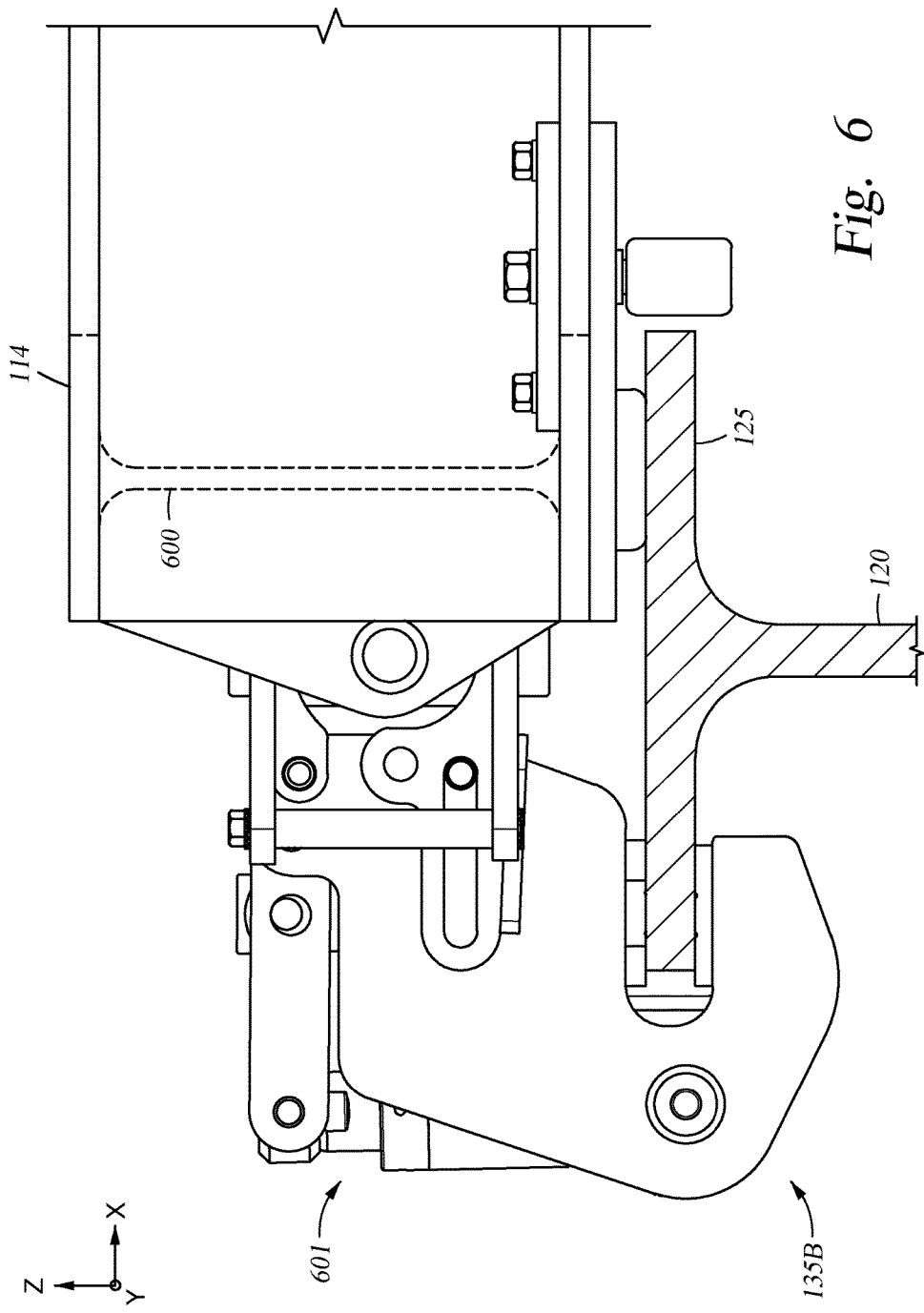
FIG. 6 is a side cross sectional view of one embodiment of another brake device.

FIG. 6 is a side cross sectional view of one embodiment of the brake device 135B. The brake device 135B may be coupled to a support member 600 of the frame 114 and is used to selectively grip the flange 125 of the beam 120. The brake device 135B includes a brake actuator 601 that controls clamping of brake pads to the flange 125.

Figure 7:
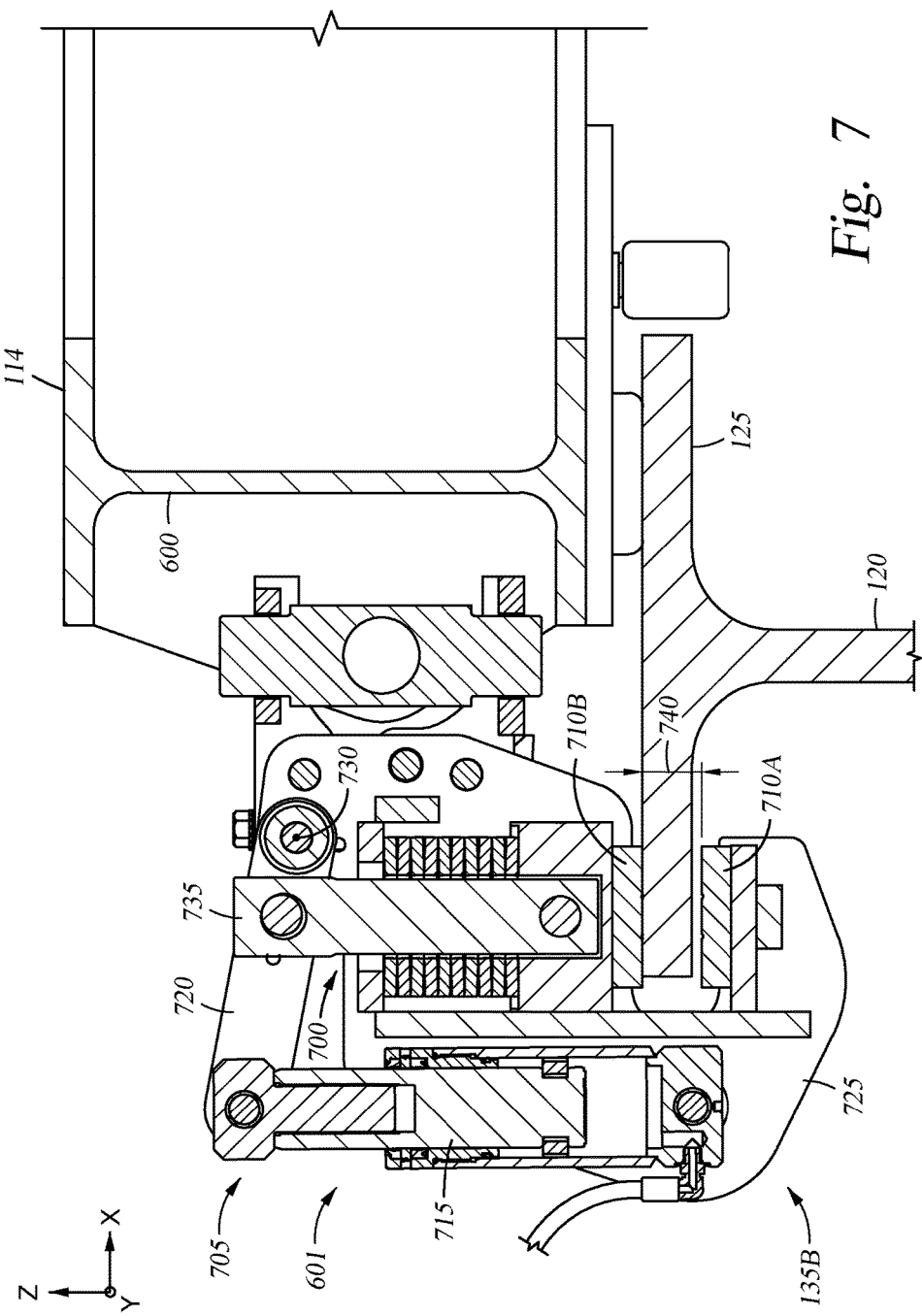
FIG. 7 is a side cross-sectional view of the brake device shown in FIG. 6.

FIG. 7 is a side cross-sectional view of the brake device 135б shown in FIG. 6. The brake device 135B is shown in a released (i.e., floating) position. The operation of the brake device 135B may be similar to the operation of the brake device 135A and the clamped position is not shown for brevity.

The brake device 135B includes a hydraulic actuation system 705 which includes a hydraulic cylinder 715 coupled to a linkage arm 720 and a brake body plate 725. The linkage arm 720 pivots about pivot point 730 and is coupled to a linkage arm 735, which is coupled to a brake pad 710B. Pressurizing the hydraulic cylinder 715 causes the brake pad 710B to lift slightly in the Z direction. The movement of the linkage arm 720 also causes compression of a spring mechanism 700 which causes the brake pads 710A and 710B to move away from each other unclamping from the flange 125. Due to the weight of the frame 114 (and the catwalk 105 coupled thereto), the brake pad 710B remains in constant contact with an upper surface of the flange 125, but slight relative movement between the brake pads 710A and 710B causes the brake pad 710A to move away from a lower surface of the flange 125. The brake pad 710A may be made of a metallic material, such as steel, and the brake pad 710B may be made of a polymer material or a composite material, although other materials may be used.

In the unclamped position, the spacing between the lower surface of the flange 125 and a gripping surface of the brake pad 710A may be greater than about 0 mm to about 2 mm. In the unclamped position, a spacing 740 between gripping surfaces of the brake pads 710A and 710B is about 36 to about 38 mm, which is within the mill tolerances of the flange 125 (i.e., the mill tolerance of the thickness of the flange, the mill tolerance for squareness of the flange) as prescribed by the ASTM. However, in other embodiments, the spacing 740 may be set to accommodate for whatever tolerance is needed to allow movement of the brake pads 710A and 7106 along the longitudinal length of the beams 120.

Similar to the brake device 135A, the spring mechanism 700 is constantly exerting a spring force such that when the hydraulic cylinder 715 is not pressurized, the brake pads 710A and 710B are in the braking position. Thus, if the system loses pressure, the brake actuator 701 is in a braking position to secure the frame 114 to the beam 120.

Figure 8:
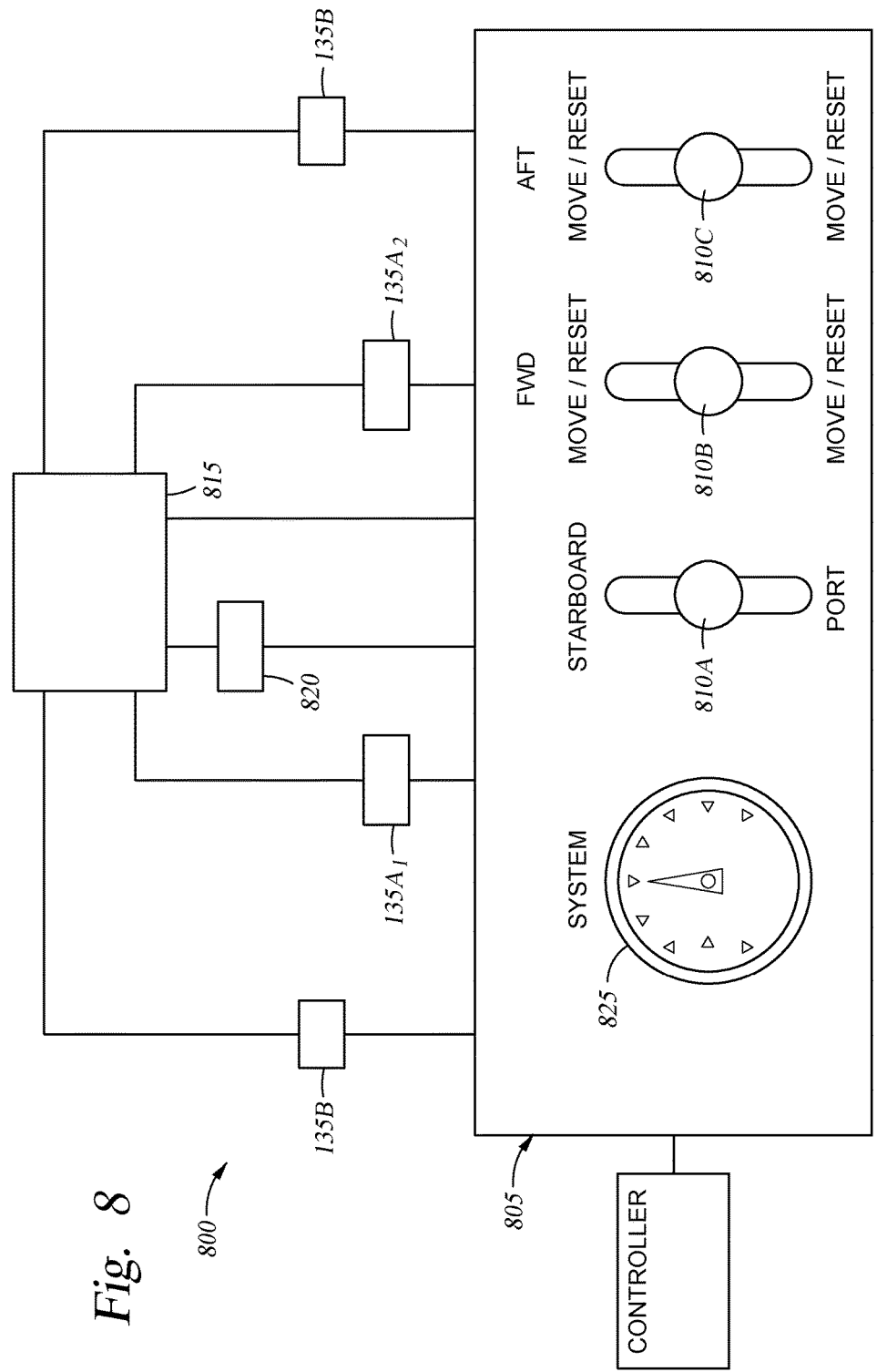
FIG. 8 is a schematic view of one embodiment of a control system for the traverse system as described herein.

FIG. 8 is a schematic view of one embodiment of a control system 800 for the traverse system 132 as described herein. The control system 800 includes a control board 805 having a plurality of control levers 810A-810C. The control system 800 also includes a fluid source 815 and a pumping system 820 to pump fluid from the fluid source 815 to the brake devices 135A and 135B. The control system 800 may also include a monitoring device 825, which may be a pressure gauge to monitor pressure in the fluid lines between the fluid source 815 and the brake devices 135A and 135B. A controller may also be included to control valves disposed along the fluid lines to control fluid flow and/or the pumping system 820. While the control board 805 shows levers, knobs, buttons, or a touch screen display may also be used.

The control lever 810A controls the direction in which to move the frame 114 relative to the beams 120 or lock down the frame 114 to the beams 120 when the lever 810A is in neutral (all brakes are set since no hydraulic pressure is provided to the brake devices 135A and 135B). The control lever 810B controls the direction of travel of the brake device 135A$_2$ (which may be the brake device 135A that is farthest away from well center in FIG. 1) relative to the frame 114. The lever 810A may also automatically release or set the brake device 200 depending on the direction of travel. The control lever 810C controls the direction of travel of the brake device 135A$_1$ (which may be the brake device 135A that is closest to well center in FIG. 1) relative to the frame 114. The lever 810C may also automatically release or set the brake device 200 depending on the direction of travel. This allows the frame 114 to be adjusted perpendicularly to the beams 120 within a few degrees.

Depending on direction of travel, the levers 810B and 810C may control whether the brake devices 135A are actuated to clamp the beam 120 while the brake devices 135B are actuated to float, or whether the brake devices 135B are actuated to clamp the beams 120 while the brake devices 135A are actuated to float. One or more of the levers 810A, 810B and 810C may also control the movement device 202, which controls the direction of movement of the frame 114 and the brake body 200.

For example, if the frame 114 is to be moved in the starboard direction, the control lever 810A would be moved to the "STARBOARD" position, and the control levers 810B and 810C would be moved to the "MOVE/RESET" position (up or down) depending on whether the operator is resetting the brake device 200 or moving the frame 114. In the frame move configuration, the brake devices 135A are actuated to brake, and the brake devices 135B are actuated to float to move the frame 114. In the brake device reset configuration the brake devices 135A are actuated to float and the brake devices 135B are actuated to brake on the beams 120. Specifically, in the reset configuration, the brake actuators 201 of the brake devices 135A are actuated to float while the brake actuators 701 of the brake devices 135B are actuated to brake (e.g., no hydraulic pressure to the brake actuators 701). Additionally, in this configuration, the cylinder bodies 215 of the brake devices 135A are actuated to move the respective brake bodies 200 in the chosen direction with the brakes released or floating.

In a specific example, if the brake bodies 200 are to be moved in a port direction, the control lever 810A would be moved to select "PORT", and the control levers 810B and 810C would be moved to select "MOVE/RESET" (down in this example) which disengages the brake devices 135A$_1$ and 135A$_2$ to float. The "MOVE/RESET" position also provides no hydraulic fluid to the brake devices 135B which causes the brake devices 135B to brake. The "MOVE/RESET" position also provides hydraulic fluid to the movement device 202 (i.e., the cylinder bodies 215) which causes the rod 210A and/or the rod 210B to extend or retract based on the direction of movement. In this example, the cylinder bodies 215 would operate to actuate the rods 210A and 210B to move the brake bodies 200 in the port direction.

In a specific example, to move the frame 114 in the port direction, the control lever 810A would be moved to select "PORT", and the control levers 810B and 810C would be moved to select "MOVE/RESET" (up in this example) which disengages the brake devices 135B from the beams 120 by providing hydraulic fluid to the brake actuators 701 of the brake devices 135B. The "MOVE/RESET" position also provides no hydraulic fluid to the brake actuator 201 of the brake devices 135A$_1$ and 135A$_2$ which causes the brake pads 410A and 410B to clamp the beams 120. The "MOVE/RESET" position also provides hydraulic fluid to the movement devices 202 (i.e., the cylinder body 215) which causes the rod 210A and/or the rod 210B to extend or retract based on the direction of movement. In this example, each cylinder body 215 would operate to actuate the rods 210A and 210B to move the frame 114 in the port direction.

If an operator only wants to move the frame 114 or one of the brake bodies 200 in a specific direction, only one of the levers 810B or 810C would be used. For example, if the brake device 135A$_1$ is to be moved in a port direction, or the frame 114 is to be moved in the port direction, the lever 810A is set to "PORT" and lever 810C is used as described above. Lever 810B remains neutral which provides no hydraulic fluid to the brake actuator 201 of the brake device 135A$_2$. Similarly, if the brake device 135A$_2$ is to be used to move the frame 114 or the brake body 200 without the use of the brake device 135A$_1$, the lever 810$_6$ is used along with the lever 810A, while the lever 810C is in neutral.

Figure 9:
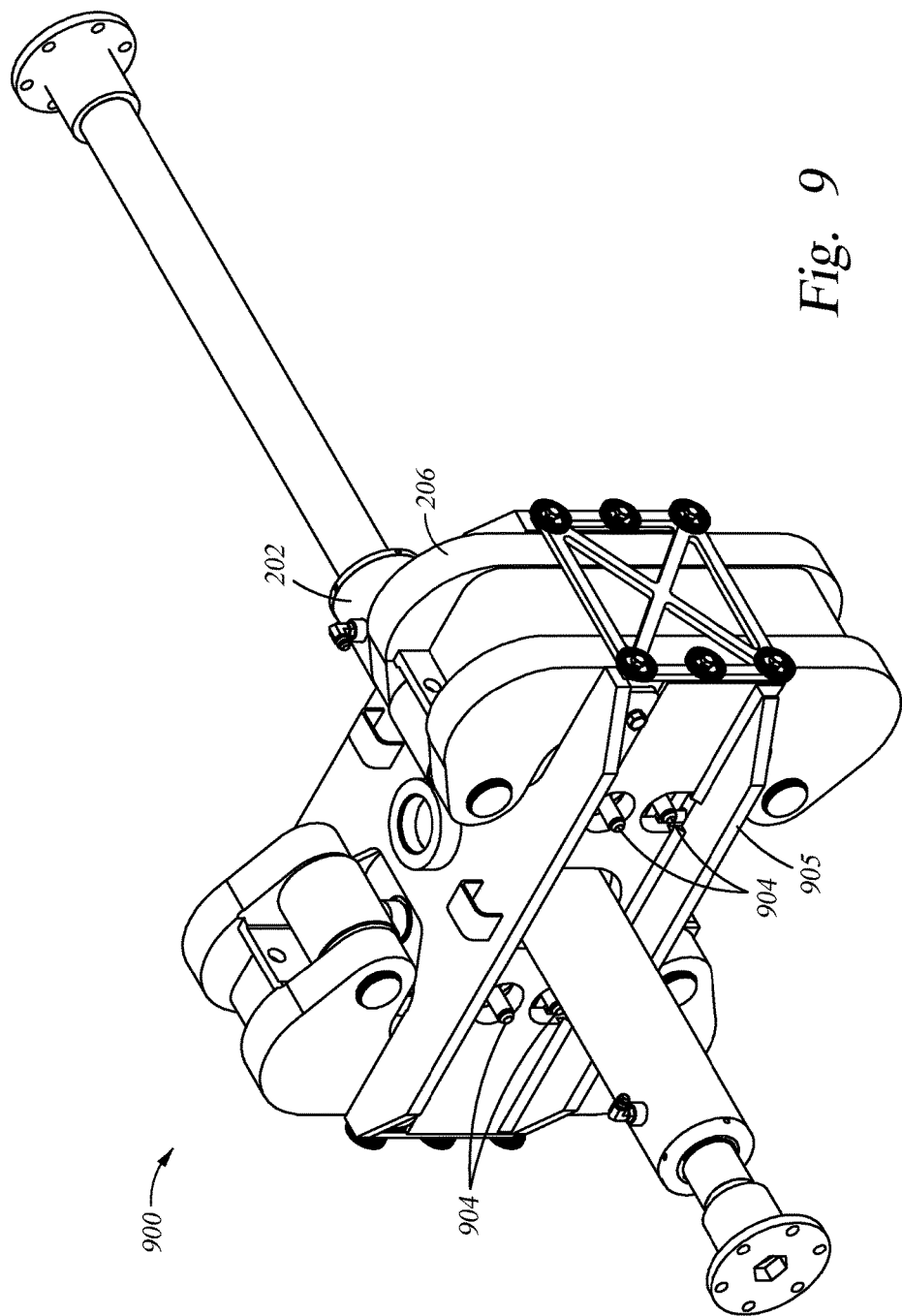
FIG. 9 is an isometric view of another embodiment of a traverse actuating and gripping device.

FIG. 9 is an isometric view of another embodiment of a traverse actuating and gripping device 900 that may be utilized as one or more of the brake devices 135A of FIG. 1 to move and/or secure a catwalk. The traverse actuating and gripping device 900 includes a body 905 having one or more fluid actuation systems 1000 (shown in FIGS. 10 and 11) within a housing 206 that selectively grips a flange of a beam, or other similar type support member of a support structure. Each of the fluid actuation systems 1000 include ports 904 for transport of a fluid thereto or therefrom. The body 905 also includes a movement device 202 (i.e., a traverse device) that may be coupled to the frame 114 of the catwalk 105 shown in FIG. 1 (similar to the embodiment shown in FIG. 2). The movement device 202 may be a hydraulic cylinder similar to the embodiment shown in FIG. 2. The traverse actuating and gripping device 900 may have a mode of operation similar to the operational mode shown and described in FIGS. 3A-3C.

Figure 10:
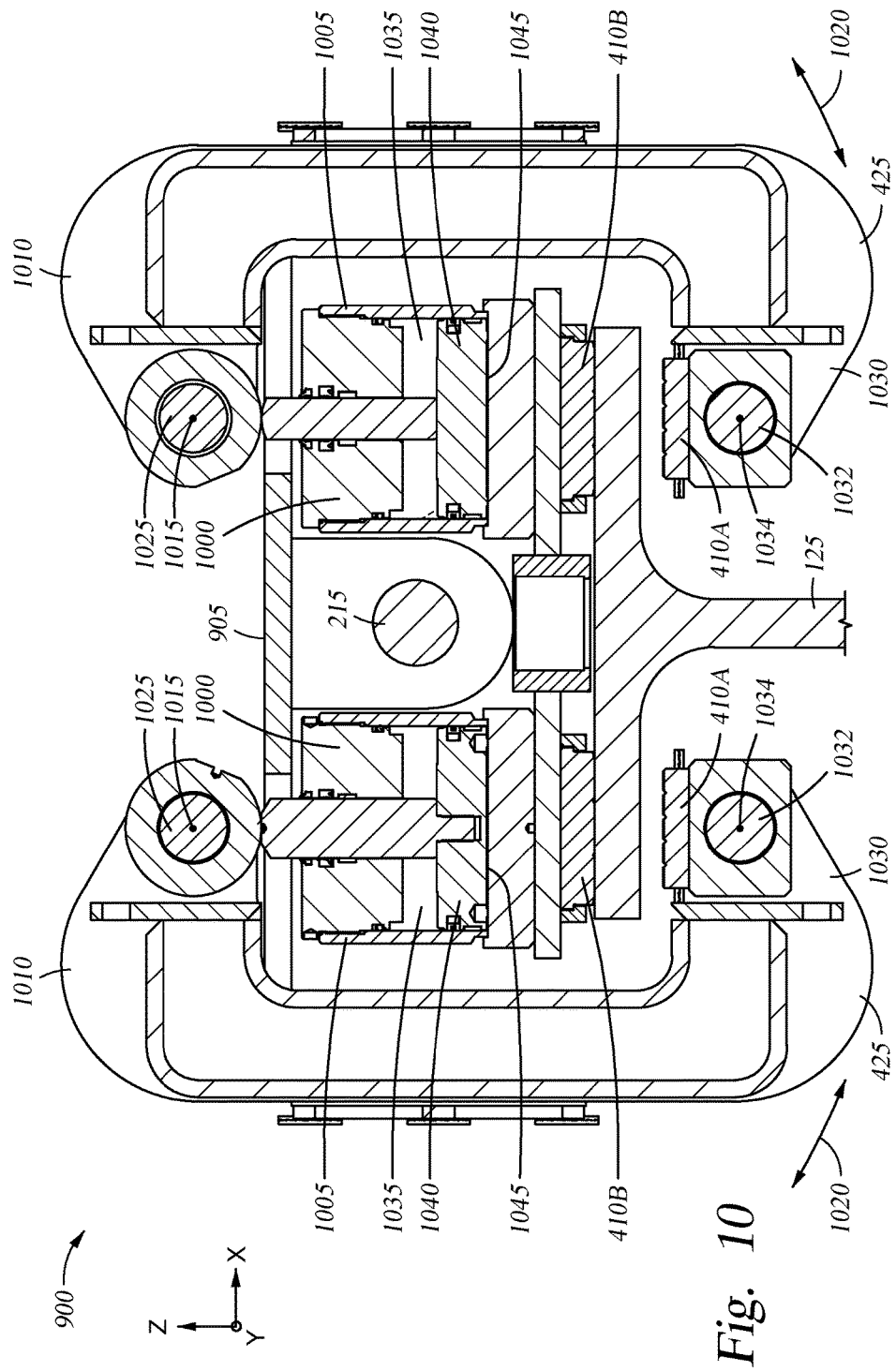
FIGS. 10 and 11 are side cross-sectional views of the traverse actuating and gripping device of FIG. 9.
Figure 11:
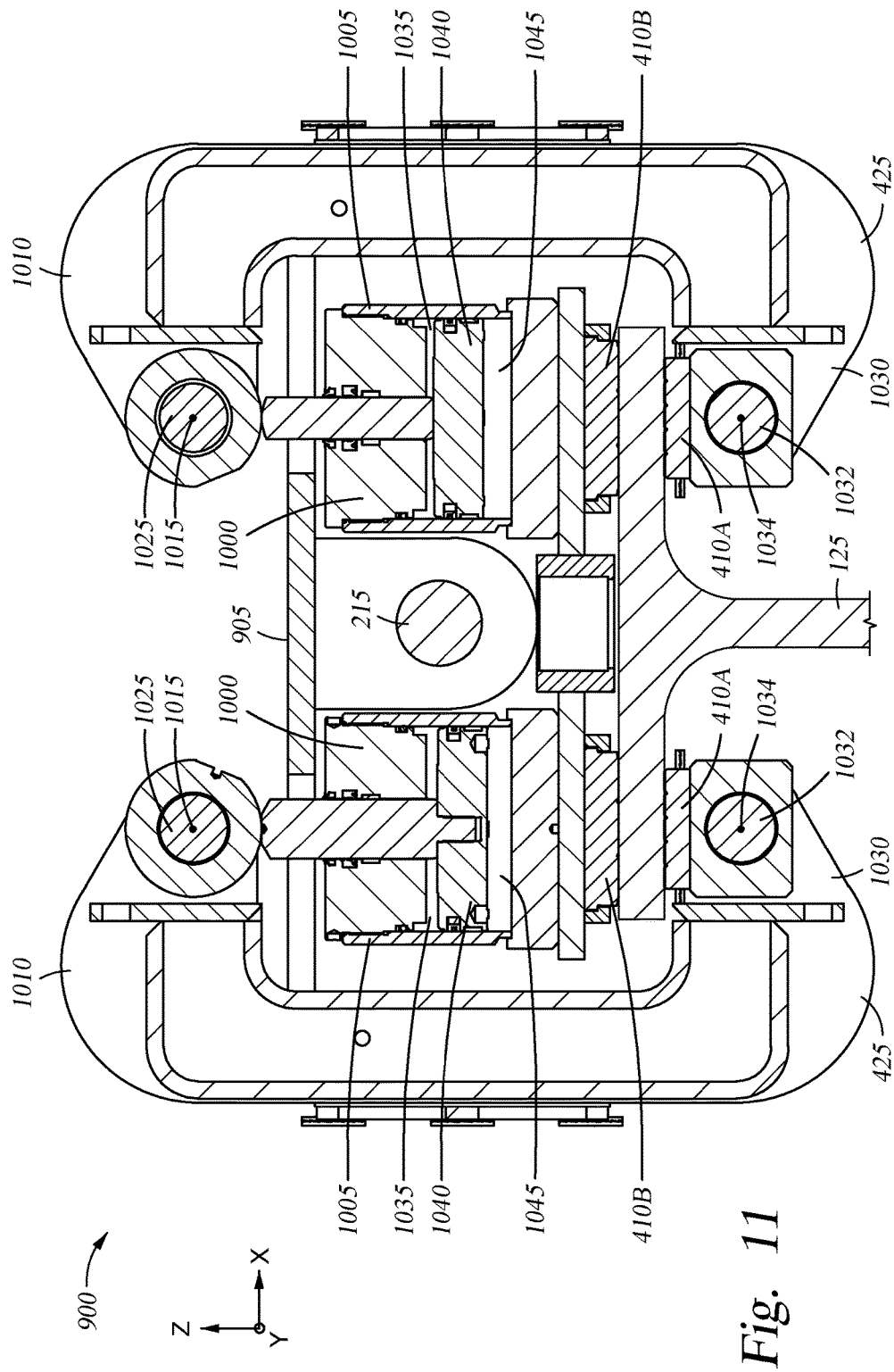

FIGS. 10 and 11 are side cross-sectional views of the body 905 and the traverse actuating and gripping device 900 having two double acting fluid actuation systems 1000. FIG. 10 shows the body 905 in a released (i.e., floating) position and FIG. 11 shows the body 905 in a fixed (i.e., gripping) position. The fluid actuation system 1000 may be a double acting hydraulic or pneumatic cylinder or other type of linear actuator that controls gripping of the gripping pads 410A and 410B.

The fluid actuation system 1000 includes a fluid cylinder 1005 coupled to a body member 425, which is configured as a "C" shaped member 1010 in this embodiment. Each of the body members 425 pivot about pivot point 1015 such that the body member 425 is movable in the direction of arrows 1020. The pivot point 1015 is provided by a shaft 1025 and allows a gripping pad end 1030 thereof to swing away from the flange 125, which assists in coupling or decoupling the traverse actuating and gripping device 900 about the beams 120 (shown in FIG. 1). To provide for effective gripping contact with uneven and or non-planar surfaces in the flange 125, the gripping pads 410A may be coupled to a shaft 1032 that allows pivoting of the gripping pads 410A about an axis 1034.

The fluid cylinder 1005 includes a first chamber 1035 that contains pressurized fluid on one side of a piston 1040 to provide the floating position shown in FIG. 10. In the fixed position shown in FIG. 11, pressurized fluid is contained in a second chamber 1045 on the other side of the piston 1040. Thus, a fluid provided to the fluid actuation system 1000 provides release of the body 905 for traverse as well as gripping of the body 905. Due to the weight of the frame 114 (and the catwalk 105 coupled thereto), the gripping pad 410B remains in constant contact with an upper surface of the flange 125.

Figure 12:
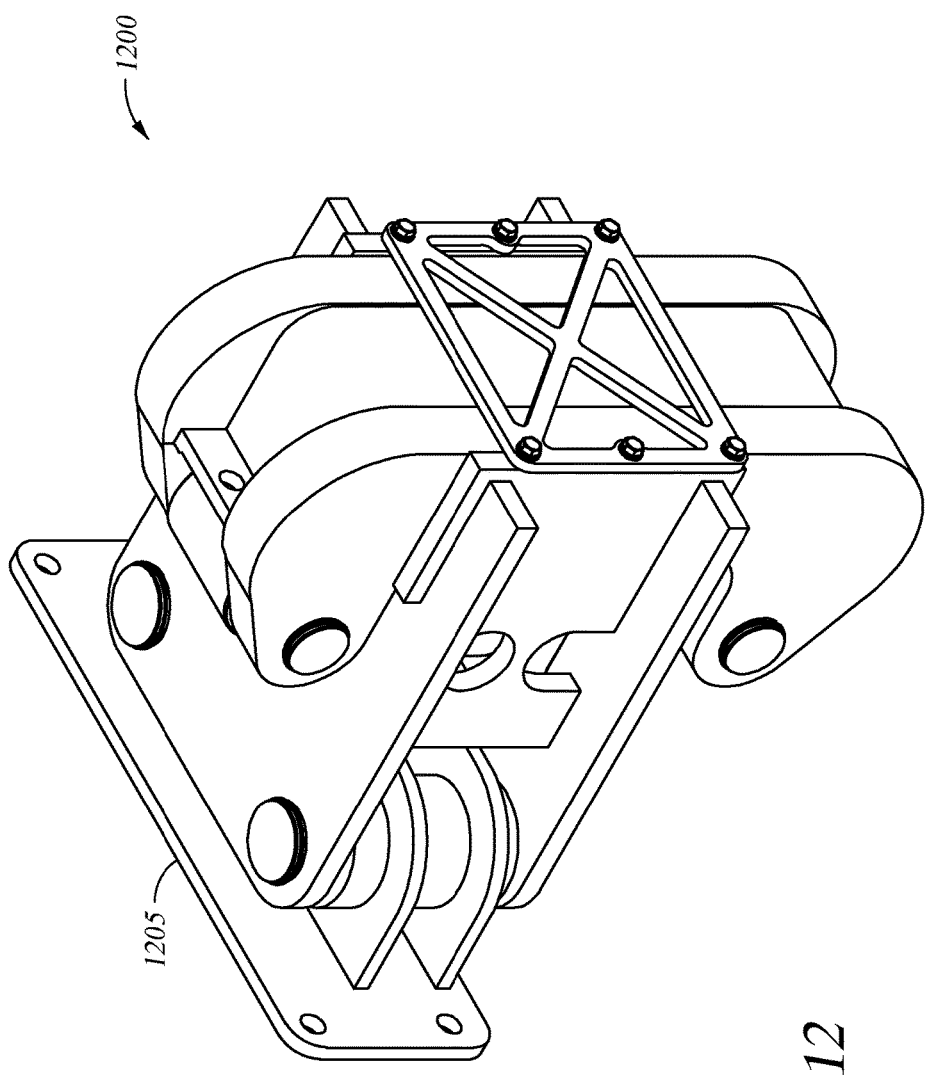
FIG. 12 is an isometric view of another embodiment of a gripping device.

FIG. 12 is a perspective view of another embodiment of a gripping device 1200 that may be used as one or more of the brake devices 135B of FIG. 1 to secure a catwalk. The gripping device 1200 may be coupled to a support member 1205 that may be attached to a web of a support member 225 of the frame 114, (shown in FIG. 1), or a structural member 1300 (shown in FIG. 13) coupled to support members 225 of the frame 114. The support member 1205 and/or the structural member 1300 may be coupled by welding or fasteners. The gripping device 1200 is used to selectively grip the flange 125 of a beam, or other support member of a support structure, and includes a fluid actuation system 1305 that controls clamping of gripping pads 710A, 710B to the flange 125.

Figure 13:
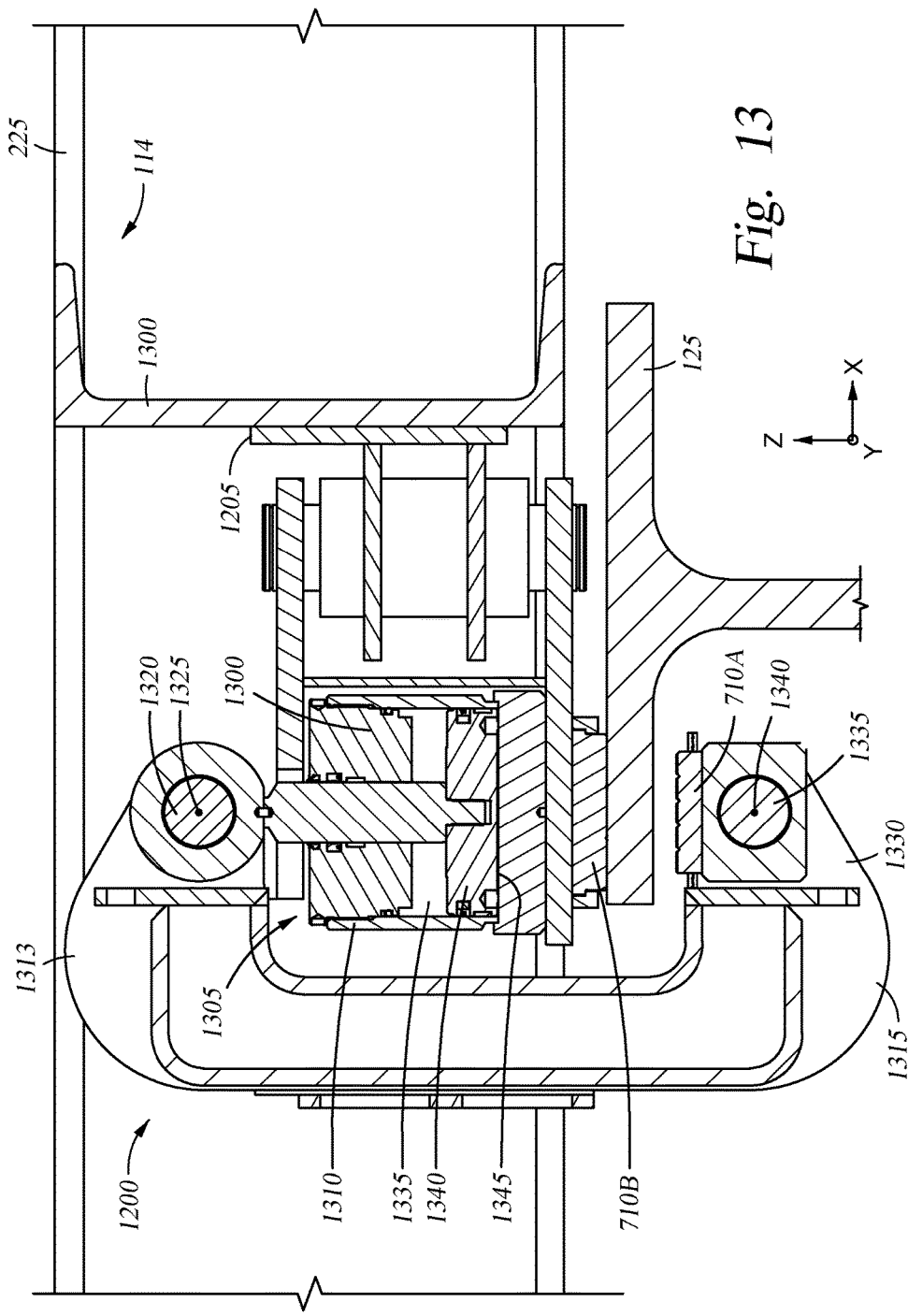
FIG. 13 is a side cross-sectional view of the gripping device of FIG. 12.

FIG. 13 is a side cross-sectional view of the gripping device 1200 shown in FIG. 12. The gripping device 1200 is shown in a released (i.e., floating) position. The operation of the gripping device 1200 may be similar to the operation of the traverse and gripping device 900 and the clamped position is not shown for brevity.

The gripping device 1200 includes a double acting fluid actuation system 1305 (similar or identical to the fluid actuation system 1000) which includes a fluid cylinder 1310 coupled to a body member 1315. The body member 1315 may be a "C" shaped member similar to the C-shaped member 1010 shown in FIGS. 10 and 11. The body member 1315 is coupled to a shaft 1320 providing a pivot point 1325 that the body member 1315 may pivot about. Additionally, a gripping pad end 1330 of the body member 1315 may include a shaft 1032 which provides movement of the gripping pad 710A about a pivot point 1340.

The fluid cylinder 1310 includes a first chamber 1335 that contains pressurized fluid on one side of a piston 1340 to provide the floating position shown in FIG. 13. In the fixed position (not shown), pressurized fluid is contained in a second chamber 1345 on the other side of the piston 1040 similar to the operation of the fluid actuation system 1000 shown and described in FIGS. 10 and 11. Thus, a fluid provided to the fluid actuation system 1305 provides release of the gripping device 1200 as well as gripping of the gripping device 1200. Due to the weight of the frame 114 (and the catwalk 105 coupled thereto), the gripping pad 710B remains in constant contact with an upper surface of the flange 125.

The traverse system 132 having one or both of the brake devices 135A and 135B as described herein simplify movement of a large, heavy structure, such as a catwalk. The brake devices 135A and 135B are able to float in the vertical axis to accommodate for camber in beams as well as rotate on its axis to accommodate for parallelism between beams. Use of the spring mechanism 400 and/or 700, or the traverse actuating and gripping device 900 and/or the gripping device 1200, provides positive gripping, which increases safety. Use of the traverse system 132 as described herein also provides movement of an object across a non-level surface relative to the length of the beams or other supporting structure. The brake devices 135A and 135B may be hydraulically coupled to each other as well as with other systems, such as a hydraulic V-door. A control system controls simultaneous operation of the brake devices 135A and 135B, as well as movement directions of the frame 114 and the brake devices 135A relative to the frame 114. A positive gripping control is provided due to the spring mechanism 400, 700, or fluid actuation systems 1000 and/or 1305, of each of the brake devices 135A and 135B, respectively.

While the foregoing is directed to embodiments of the disclosure, other and further disclosure of the invention may be devised without departing from the basic scope thereof, and the scope thereof is determined by the claims that follow.

The invention claimed is:

1. A traverse actuating and gripping system configured to move or secure a catwalk relative to a support structure containing at least one support member, the system comprising:
    a body;
    an upper gripping pad coupled to the body and configured to contact a side of the at least one support member and a lower gripping pad coupled to the body and configured to contact an opposing side of the at least one support member, wherein the upper gripping pad and the lower gripping pad are coupled to a C-shaped member; and
    an actuator coupled to at least one of the gripping pads and configured to move the gripping pads between a gripping position that grips the at least one support member and an open position that spaces one of the gripping pads away from the at least one support member, wherein the C-shaped member is coupled to a shaft that allows the C-shaped member to pivot about an axis of the shaft and swing the lower gripping pad away from the at least one support member.

2. The system of claim 1, wherein the open position comprises a dimension measured between the gripping pads that is equal to or greater than a mill tolerance of the at least one support member.

3. The system of claim 1, wherein the upper gripping pad is coupled to the actuator.

4. The system of claim 3, wherein the actuator is a double-acting fluid cylinder.

5. The system of claim 1, wherein the actuator comprises a fluid cylinder.

6. The system of claim 5, wherein the fluid cylinder is a double-acting fluid cylinder.

7. A catwalk system for transferring tubulars, the catwalk system comprising:
    a frame for supporting the catwalk;
    a support structure that supports the frame of the catwalk; and
    a traverse actuating and gripping device for at least one of moving the frame, securing the frame, or combinations thereof, relative to a support member of the support structure, the traverse actuating and gripping device comprising:
        a body;
        an upper gripping pad for contacting a side of the support member and a lower gripping pad for contacting an opposing side of the support member disposed in the body; and
        an actuator coupled to at least one of the gripping pads for moving the gripping pads between a gripping position that grips the support member and an open position that spaces one of the gripping pads away from the support member, wherein the lower gripping pad is coupled to a shaft that allows pivoting of the lower gripping pad about an axis of the shaft.

8. The system of claim 7, wherein the open position comprises a dimension measured between the gripping pads that is equal to or greater than a mill tolerance of the support member.

9. The system of claim 7, wherein the actuator comprises a fluid cylinder.

10. The system of claim 9, wherein the fluid cylinder is a double-acting fluid cylinder.

11. The system of claim 7, wherein the upper gripping pad is coupled to the actuator.

12. The system of claim 11, wherein the lower gripping pad is coupled to the actuator by a C-shaped member that is coupled to the shaft to allow the C-shaped member and the lower gripping pad to pivot about the axis of the shaft and swing the lower gripping pad away from the support member.

13. The system of claim 11, wherein the actuator is a double-acting fluid cylinder.

14. A method for moving a frame relative to a drill floor, the method comprising:
providing a frame;
providing a support structure that supports the frame, wherein the support structure has at least one support member having a flange;
gripping the flange with a first gripping device and a second gripping device;
actuating an actuator to release the second gripping device from gripping the flange; and
moving the frame along a length of the support structure by intermittently gripping the flange with the second gripping device, wherein the second gripping device is pivotable away from the at least one support member.

15. The method of claim 14, further comprising:
moving the first and second gripping devices relative to the frame.

16. The method of claim 15, wherein the first gripping device comprises an upper gripping pad contacting the flange, and the second gripping device comprises a lower gripping pad adapted to contact an opposing side of the flange, and the moving the first and second gripping devices further comprises:
actuating a fluid cylinder that is operably coupled to one of the gripping pads to move the gripping pads to an open position.

17. The method of claim 16, wherein the open position comprises a dimension measured between the upper and lower gripping pads that is equal to or greater than a mill tolerance of the flange.

18. The method of claim 16, wherein the fluid cylinder is pressurized to move the lower gripping pad between an open position and a gripping position.

19. The method of claim 18, wherein the fluid cylinder comprises a double-acting fluid cylinder.

* * * * *